US008102992B2

(12) United States Patent
Paden et al.

(10) Patent No.: US 8,102,992 B2
(45) Date of Patent: *Jan. 24, 2012

(54) DYNAMIC LOAD BALANCING BETWEEN MULTIPLE LOCATIONS WITH DIFFERENT TELEPHONY SYSTEM

(75) Inventors: Jonathan Paden, Austin, TX (US); Bobby Sams, Austin, TX (US); Jon Harris, Little Elm, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 1382 days.

This patent is subject to a terminal disclaimer.

(21) Appl. No.: 11/705,482

(22) Filed: Feb. 12, 2007

(65) Prior Publication Data

US 2007/0165830 A1 Jul. 19, 2007

Related U.S. Application Data

(63) Continuation of application No. 10/958,632, filed on Oct. 5, 2004, now Pat. No. 7,197,130.

(51) Int. Cl.
*H04M 3/00* (2006.01)
(52) U.S. Cl. ............. 379/265.02; 370/237; 379/221.05; 379/221.07
(58) Field of Classification Search .......... 370/351–356, 370/259–271, 237; 379/221.14–225, 229, 379/265.01–266.1, 88.01–88.05, 219–221.12; 709/201–207, 223–232, 238–244; 704/270.1–278
See application file for complete search history.

(56) References Cited

U.S. PATENT DOCUMENTS

| 4,953,204 | A | * | 8/1990 | Cuschleg et al. | ........ | 379/266.05 |
|---|---|---|---|---|---|---|
| 4,967,405 | A | | 10/1990 | Upp | | |
| 5,335,269 | A | * | 8/1994 | Steinlicht | ................. | 379/266.05 |
| 5,455,903 | A | | 10/1995 | Jolissaint | | |
| 5,497,373 | A | | 3/1996 | Hulen | | |
| 5,522,046 | A | | 5/1996 | McMillen | | |
| 5,530,744 | A | * | 6/1996 | Charalambous et al. | | 379/266.08 |
| 5,555,299 | A | | 9/1996 | Maloney | | |

(Continued)

FOREIGN PATENT DOCUMENTS

EP 0 424 015 A2 4/1991

(Continued)

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

*Primary Examiner* — Hemant Patel
(74) *Attorney, Agent, or Firm* — Toler Law Group, PC

(57) ABSTRACT

A system and method for dynamic load balancing between telephony systems are provided. The system includes an input to receive a call from a primary interactive voice response (IVR) system. The system also includes an IVR unit responsive to the call to receive input from a caller. The system also includes logic to select a telephony system from among a plurality of telephony systems based on the input from the caller and based on agent availability data of the plurality of telephony systems. The system further includes at least one output to send the received call for allocation to a call center site of the selected telephony system based on a routing protocol associated with the selected telephony system.

22 Claims, 2 Drawing Sheets

U.S. PATENT DOCUMENTS

| | | | |
|---|---|---|---|
| 5,652,789 A | 7/1997 | Miner | |
| 5,754,639 A * | 5/1998 | Flockhart et al. | 379/266.05 |
| 5,754,978 A | 5/1998 | Perez-Mendez | |
| 5,923,745 A | 7/1999 | Hurd | |
| 5,940,476 A | 8/1999 | Morganstein | |
| 5,946,388 A | 8/1999 | Walker | |
| 5,953,704 A | 9/1999 | McIlroy | |
| 5,999,965 A | 12/1999 | Kelly | |
| 6,002,689 A | 12/1999 | Christie | |
| 6,002,760 A | 12/1999 | Gisby | |
| 6,003,011 A | 12/1999 | Sarin | |
| 6,049,594 A | 4/2000 | Furman | |
| 6,118,866 A * | 9/2000 | Shtivelman | 379/309 |
| 6,119,101 A | 9/2000 | Peckover | |
| 6,173,266 B1 | 1/2001 | Marx | |
| 6,173,289 B1 | 1/2001 | Sonderegger | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter | |
| 6,317,439 B1 | 11/2001 | Cardona | |
| 6,333,980 B1 | 12/2001 | Hollatz | |
| 6,353,608 B1 | 3/2002 | Cullers | |
| 6,366,658 B1 | 4/2002 | Bjornberg | |
| 6,366,668 B1 | 4/2002 | Borst | |
| 6,381,329 B1 * | 4/2002 | Uppaluru et al. | 379/266.04 |
| 6,385,584 B1 | 5/2002 | McAllister | |
| 6,389,400 B1 | 5/2002 | Bushey | |
| 6,400,804 B1 | 6/2002 | Bilder | |
| 6,400,996 B1 | 6/2002 | Hoffberg | |
| 6,405,159 B2 | 6/2002 | Bushey | |
| 6,414,966 B1 | 7/2002 | Kulkarni | |
| 6,418,424 B1 | 7/2002 | Hoffberg | |
| 6,442,247 B1 | 8/2002 | Garcia | |
| 6,510,414 B1 | 1/2003 | Chaves | |
| 6,519,562 B1 | 2/2003 | Phillips | |
| 6,529,871 B1 | 3/2003 | Kanevsky | |
| 6,546,087 B2 | 4/2003 | Shaffer | |
| 6,553,113 B1 * | 4/2003 | Dhir et al. | 379/265.02 |
| 6,570,967 B2 | 5/2003 | Katz | |
| 6,584,180 B2 | 6/2003 | Nemoto | |
| 6,587,556 B1 | 7/2003 | Judkins | |
| 6,598,136 B1 | 7/2003 | Norrod | |
| 6,600,736 B1 | 7/2003 | Ball | |
| 6,603,854 B1 | 8/2003 | Judkins | |
| 6,614,781 B1 | 9/2003 | Elliott | |
| 6,631,186 B1 | 10/2003 | Adams et al. | |
| 6,678,360 B1 | 1/2004 | Katz | |
| 6,678,718 B1 | 1/2004 | Khouri | |
| 6,690,788 B1 | 2/2004 | Bauer | |
| 6,694,012 B1 | 2/2004 | Posthuma | |
| 6,697,460 B2 | 2/2004 | Knott | |
| 6,700,972 B1 | 3/2004 | McHugh | |
| 6,704,404 B1 | 3/2004 | Burnett | |
| 6,707,789 B1 | 3/2004 | Arslan | |
| 6,711,249 B2 * | 3/2004 | Weissman et al. | 379/221.06 |
| 6,714,631 B1 | 3/2004 | Martin | |
| 6,721,416 B1 | 4/2004 | Farrell | |
| 6,731,722 B2 | 5/2004 | Coffey | |
| 6,738,473 B1 | 5/2004 | Burg | |
| 6,744,861 B1 | 6/2004 | Pershan | |
| 6,744,877 B1 * | 6/2004 | Edwards | 379/265.02 |
| 6,751,306 B2 | 6/2004 | Himmel | |
| 6,757,306 B1 | 6/2004 | Klish, II | |
| 6,766,320 B1 | 7/2004 | Wang | |
| 6,775,359 B1 | 8/2004 | Ron | |
| 6,778,643 B1 | 8/2004 | Bushey | |
| 6,792,096 B2 | 9/2004 | Martin | |
| 6,807,274 B2 | 10/2004 | Joseph | |
| 6,823,307 B1 | 11/2004 | Steinbiss | |
| 6,831,932 B1 | 12/2004 | Boyle | |
| 6,831,966 B1 * | 12/2004 | Tegan et al. | 379/88.16 |
| 6,832,224 B2 | 12/2004 | Gilmour | |
| 6,842,504 B2 | 1/2005 | Mills | |
| 6,847,711 B2 | 1/2005 | Knott | |
| 6,847,714 B2 | 1/2005 | Das | |
| 6,847,715 B1 | 1/2005 | Swartz | |
| 6,853,722 B2 | 2/2005 | Joseph | |
| 6,853,966 B2 | 2/2005 | Bushey | |
| 6,856,679 B2 | 2/2005 | Pennington, Jr. | |
| 6,859,529 B2 | 2/2005 | Duncan | |
| 6,871,212 B2 | 3/2005 | Khouri | |
| 6,879,683 B1 | 4/2005 | Fain | |
| 6,885,734 B1 | 4/2005 | Eberle | |
| 6,891,932 B2 | 5/2005 | Bhargava | |
| 6,895,083 B1 | 5/2005 | Bers | |
| 6,901,366 B1 | 5/2005 | Kuhn | |
| 6,907,119 B2 | 6/2005 | Case | |
| 6,915,246 B2 | 7/2005 | Gusler | |
| 6,922,689 B2 * | 7/2005 | Shtivelman | 1/1 |
| 6,963,983 B2 | 11/2005 | Munson | |
| 6,964,023 B2 | 11/2005 | Maes | |
| 7,006,605 B1 | 2/2006 | Morganstein | |
| 7,012,888 B2 | 3/2006 | Schoeneberger | |
| 7,013,112 B2 | 3/2006 | Haller | |
| 7,027,586 B2 | 4/2006 | Bushey | |
| 7,031,444 B2 | 4/2006 | Shen | |
| 7,035,388 B2 | 4/2006 | Kurosaki | |
| 7,050,560 B2 | 5/2006 | Martin | |
| 7,062,018 B2 | 6/2006 | Martin | |
| 7,065,201 B2 | 6/2006 | Bushey | |
| 7,076,049 B2 | 7/2006 | Bushey | |
| 7,080,323 B2 | 7/2006 | Knott | |
| 7,092,370 B2 | 8/2006 | Jiang | |
| 7,095,827 B2 | 8/2006 | Guedalia | |
| 7,095,842 B2 | 8/2006 | Brown | |
| 7,107,232 B2 | 9/2006 | Morris | |
| 7,120,244 B2 | 10/2006 | Joseph | |
| 7,131,117 B2 | 10/2006 | Mills | |
| 7,139,369 B2 | 11/2006 | Martin | |
| 7,142,652 B2 | 11/2006 | Ho | |
| 7,146,383 B2 | 12/2006 | Martin | |
| 7,149,303 B1 * | 12/2006 | Laurinavichus | 379/265.01 |
| 7,170,992 B2 | 1/2007 | Knott | |
| 7,174,011 B2 | 2/2007 | Kortum | |
| 7,180,985 B2 * | 2/2007 | Colson et al. | 379/88.16 |
| 7,184,534 B2 | 2/2007 | Birch | |
| 7,197,130 B2 * | 3/2007 | Paden et al. | 379/265.02 |
| 7,242,751 B2 | 7/2007 | Bushey | |
| 7,245,711 B2 | 7/2007 | Margolis | |
| 7,245,716 B2 | 7/2007 | Brown | |
| 7,249,321 B2 | 7/2007 | Bushey | |
| 7,272,222 B2 | 9/2007 | Joseph | |
| 7,305,070 B2 | 12/2007 | Kortum | |
| 7,349,527 B2 | 3/2008 | Yacoub | |
| 7,356,139 B2 | 4/2008 | Turcan | |
| 7,356,475 B2 | 4/2008 | Novack | |
| 7,376,228 B2 | 5/2008 | Haug, Jr. | |
| 7,379,537 B2 | 5/2008 | Bushey | |
| 7,383,170 B2 | 6/2008 | Mills | |
| 7,398,212 B2 | 7/2008 | Yacoub | |
| 7,415,101 B2 | 8/2008 | Bushey | |
| 7,415,106 B2 | 8/2008 | Chang | |
| 7,418,095 B2 | 8/2008 | Knott | |
| 7,450,698 B2 | 11/2008 | Bushey | |
| 7,512,545 B2 | 3/2009 | Knott | |
| 7,545,925 B2 | 6/2009 | Williams | |
| 7,551,723 B2 | 6/2009 | Mills | |
| 7,573,999 B2 | 8/2009 | Turcan | |
| 2001/0018672 A1 | 8/2001 | Petters | |
| 2001/0032229 A1 | 10/2001 | Hulls | |
| 2002/0046030 A1 | 4/2002 | Haritsa | |
| 2002/0059169 A1 | 5/2002 | Quarterman | |
| 2002/0067714 A1 | 6/2002 | Crain | |
| 2002/0087385 A1 | 7/2002 | Vincent | |
| 2002/0133413 A1 | 9/2002 | Chang | |
| 2002/0156699 A1 | 10/2002 | Gray | |
| 2002/0165732 A1 | 11/2002 | Ezzeddine | |
| 2003/0035381 A1 | 2/2003 | Chen | |
| 2003/0069937 A1 | 4/2003 | Khouri | |
| 2003/0097428 A1 | 5/2003 | Afkhami | |
| 2003/0130864 A1 | 7/2003 | Ho | |
| 2003/0144846 A1 | 7/2003 | Denenberg | |
| 2003/0144919 A1 | 7/2003 | Trompette | |
| 2003/0165223 A1 | 9/2003 | Timmins | |
| 2003/0187732 A1 | 10/2003 | Seta | |
| 2003/0187773 A1 | 10/2003 | Santos | |

| | | |
|---|---|---|
| 2003/0195753 A1 | 10/2003 | Homuth |
| 2003/0204435 A1 | 10/2003 | McQuilkin |
| 2004/0006473 A1 | 1/2004 | Mills |
| 2004/0042592 A1 | 3/2004 | Knott |
| 2004/0073569 A1 | 4/2004 | Knott |
| 2004/0083479 A1 | 4/2004 | Bondarenko |
| 2004/0103017 A1 | 5/2004 | Reed |
| 2004/0125937 A1 | 7/2004 | Turcan |
| 2004/0161078 A1 | 8/2004 | Knott |
| 2004/0230438 A1 | 11/2004 | Pasquale |
| 2004/0243568 A1 | 12/2004 | Wang |
| 2005/0015744 A1 | 1/2005 | Bushey |
| 2005/0055216 A1 | 3/2005 | Bushey |
| 2005/0075894 A1 | 4/2005 | Bushey |
| 2005/0080667 A1 | 4/2005 | Knott |
| 2005/0131892 A1 | 6/2005 | Knott |
| 2005/0141692 A1 | 6/2005 | Scherer |
| 2005/0201547 A1 | 9/2005 | Burg |
| 2005/0254632 A1 | 11/2005 | Pasquale |
| 2006/0018443 A1 | 1/2006 | Knott |
| 2006/0023863 A1 | 2/2006 | Joseph |
| 2006/0026049 A1 | 2/2006 | Joseph |
| 2006/0036437 A1 | 2/2006 | Bushey |
| 2006/0039547 A1 | 2/2006 | Klein |
| 2006/0050865 A1 | 3/2006 | Kortum |
| 2006/0062375 A1 | 3/2006 | Pasquale |
| 2006/0093097 A1 | 5/2006 | Chang |
| 2006/0100998 A1 | 5/2006 | Edwards |
| 2006/0109974 A1 | 5/2006 | Paden |
| 2006/0115070 A1 | 6/2006 | Bushey |
| 2006/0126808 A1 | 6/2006 | Dallessandro |
| 2006/0126811 A1 | 6/2006 | Bushey |
| 2006/0153345 A1 | 7/2006 | Bushey |
| 2006/0161431 A1 | 7/2006 | Bushey |
| 2006/0177040 A1 | 8/2006 | Mitra |
| 2006/0188087 A1 | 8/2006 | Kortum |
| 2006/0198505 A1 | 9/2006 | Kortum |
| 2006/0215831 A1 | 9/2006 | Knott |
| 2006/0215833 A1 | 9/2006 | Mahoney |
| 2006/0256932 A1 | 11/2006 | Bushey |
| 2006/0256956 A1 | 11/2006 | Lee |
| 2006/0291642 A1 | 12/2006 | Bushey |
| 2007/0019800 A1 | 1/2007 | Bushey |
| 2007/0025528 A1 | 2/2007 | Knott |
| 2007/0025542 A1 | 2/2007 | Bushey |
| 2007/0041523 A1 | 2/2007 | Paden |
| 2007/0041538 A1 | 2/2007 | Paden |
| 2007/0041551 A1 | 2/2007 | Whitecotten |
| 2007/0047718 A1 | 3/2007 | Idler |
| 2007/0047720 A1 | 3/2007 | Brandt |
| 2007/0116230 A1 | 5/2007 | Brandt |
| 2008/0008308 A1 | 1/2008 | Knott |

FOREIGN PATENT DOCUMENTS

| | | |
|---|---|---|
| EP | 0 424 015 A3 | 4/1991 |
| EP | 0 424 015 B1 | 4/1991 |
| WO | 01/37539 A2 | 5/2001 |
| WO | 2004/017584 | 4/2004 |
| WO | 2004/049222 A2 | 10/2004 |

* cited by examiner

US 8,102,992 B2

DYNAMIC LOAD BALANCING BETWEEN MULTIPLE LOCATIONS WITH DIFFERENT TELEPHONY SYSTEM

CROSS-REFERENCE TO RELATED APPLICATION(S)

This application is a Continuation Patent Application of and claims priority from U.S. patent application Ser. No. 10/958,632, filed on Oct. 5, 2004 and entitled "DYNAMIC LOAD BALANCING BETWEEN MULTIPLE LOCATIONS WITH DIFFERENT TELEPHONY SYSTEM," which is hereby incorporated by reference.

FIELD OF THE DISCLOSURE

The present disclosure relates to systems for distributing calls to call centers.

BACKGROUND

Multiple vendors provide telephone system equipment for distributing calls to different call centers in different locations. Each vendor's telephony system typically uses one of the common standards for its equipment to manage traffic across the various call centers.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

In some cases, two or more different telephony systems (e.g. from two or more different vendors) may receive the same call types from a single Interactive Voice Response (IVR) or Voice Response Unit (VRU). The allocation of calls between the two or more different telephony systems needs to be varied due to staffing issues at the multiple call centers and the unpredictable nature of call traffic.

Embodiments of the present invention use a secondary Interactive Voice Response (IVR) application to facilitate dynamic load balancing between two or more call centers that use different systems to manage their own traffic. Traffic is balanced prior to committing a call to a particular vendor's traffic management component, such as an Intelligent Call Management (ICM) component or another vendor's component, to provide a pre-ICM load-balancing approach. The application corrects service level shifts and provides real-time alerts and statistics to one or more businesses associated with the call centers.

Figure 1:
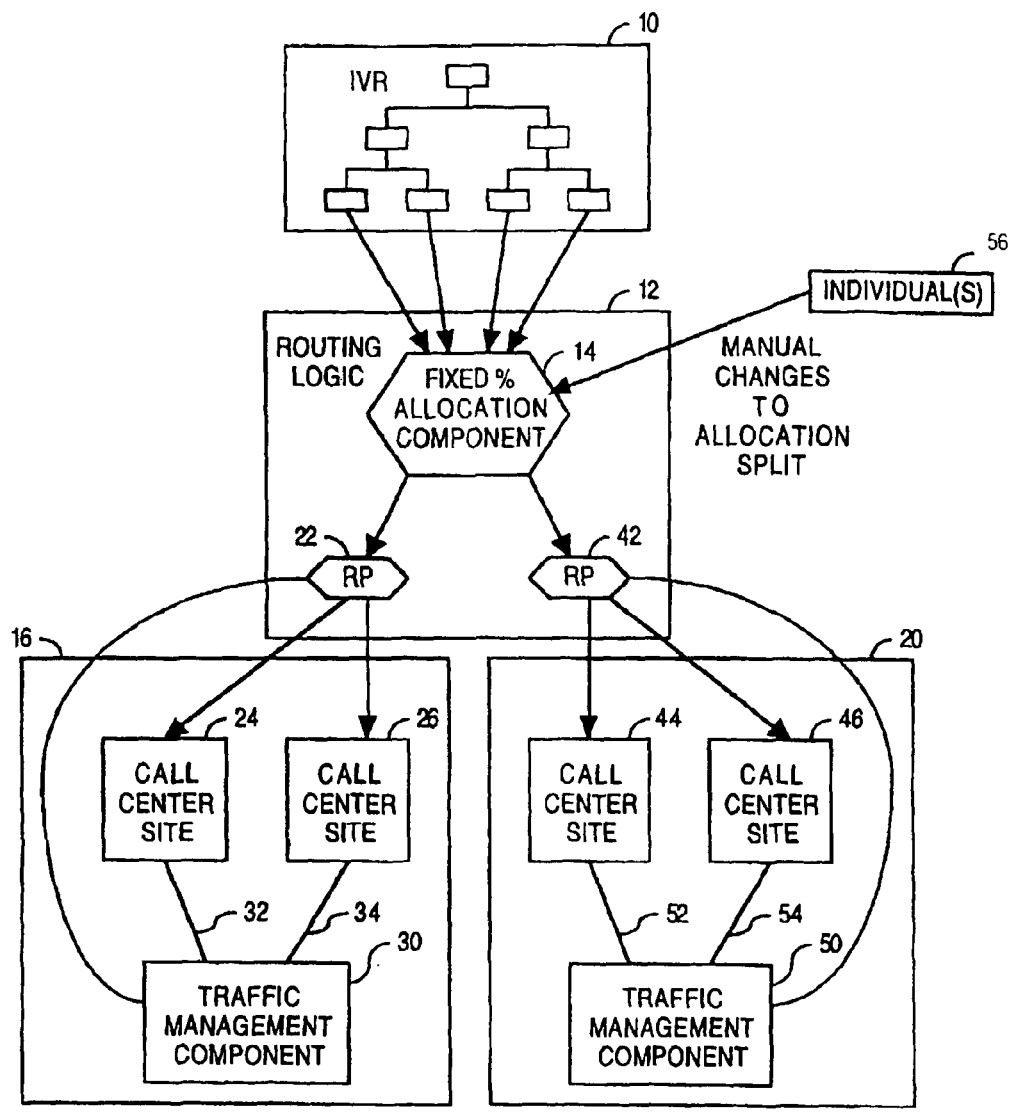
FIG. 1 is a schematic diagram of a first embodiment of a pre-ICM load balancing system.

FIG. 1 is a schematic diagram of a first embodiment of a pre-ICM load balancing system that is absent the aforementioned IVR application. This embodiment is described to contrast with FIG. 2, which shows a particular preferred embodiment that includes the secondary IVR application.

A primary IVR 10 receives calls that are processed by routing logic 12. The routing logic 12 includes an allocation component 14 to allocate a first percentage of the calls for a first telephony system 16 and a second percentage of the calls for a second telephony system 20. In the case of the two telephony systems 16 and 20, the sum of the first percentage and the second percentage is 100%. Those having ordinary skill will appreciate that the routing logic 12 may support more than two telephony systems in general.

The first telephony system 16 and the second telephony system 20 may be different types of telephony systems provided by different vendors. Examples of the different vendors include, but are not limited to, CISCO Systems, Inc. and GENESYS.

The routing logic 12 comprises a first routing protocol (RP) component 22 to route each of the calls allocated to the first telephony system 16 to a corresponding one of multiple call centers 24 and 26. The call centers 24 and 26 typically are disposed at different geographical locations. Agents at the call centers 24 and 26 receive the calls and service the calling parties. A first traffic management component 30 is in communication with the call centers 24 and 26 via peripheral gateway lines 32 and 34, respectively. The first traffic management component 30 determines call center information such as agent availability and service levels at the call centers 24 and 26. The first RP component 22 is responsive to the call center information from the first traffic management component 30 to vary how subsequent calls are to be allocated between the call centers 24 and 26

The routing logic 12 further comprises a second routing protocol (RP) component 42 to route each of the calls allocated to the second telephony system 20 to a corresponding one of multiple call centers 44 and 46. The call centers 44 and 46 typically are disposed at different geographical locations. Agents at the call centers 44 and 46 receive the calls and service the calling parties. A second traffic management component 50 is in communication with the call centers 44 and 46 via peripheral gateway lines 52 and 54, respectively. The second traffic management component 50 determines call center information such as agent availability and service levels at the call centers 44 and 46. The second RP component 42 is responsive to the call center information from the second traffic management component 50 to vary how subsequent calls are to be allocated between the call centers 44 and 46.

The allocation split between the first telephony system 16 and the second telephony system 20 produced by the allocation component 14 is manually changed by individual(s) 56 managing the system. The allocation of calls between the telephony systems 16 and 20 needs to be varied from initial percentages due to changes in staffing at the call centers 24, 26, 44 and 46 and the unpredictable nature of call traffic received by the primary IVR 10. The manual changes performed by the individual(s) 56 are reactive in nature and typically take minutes or hours of time to occur. Undesirable service levels and additional expenses may result using the manual approach.

Figure 2:
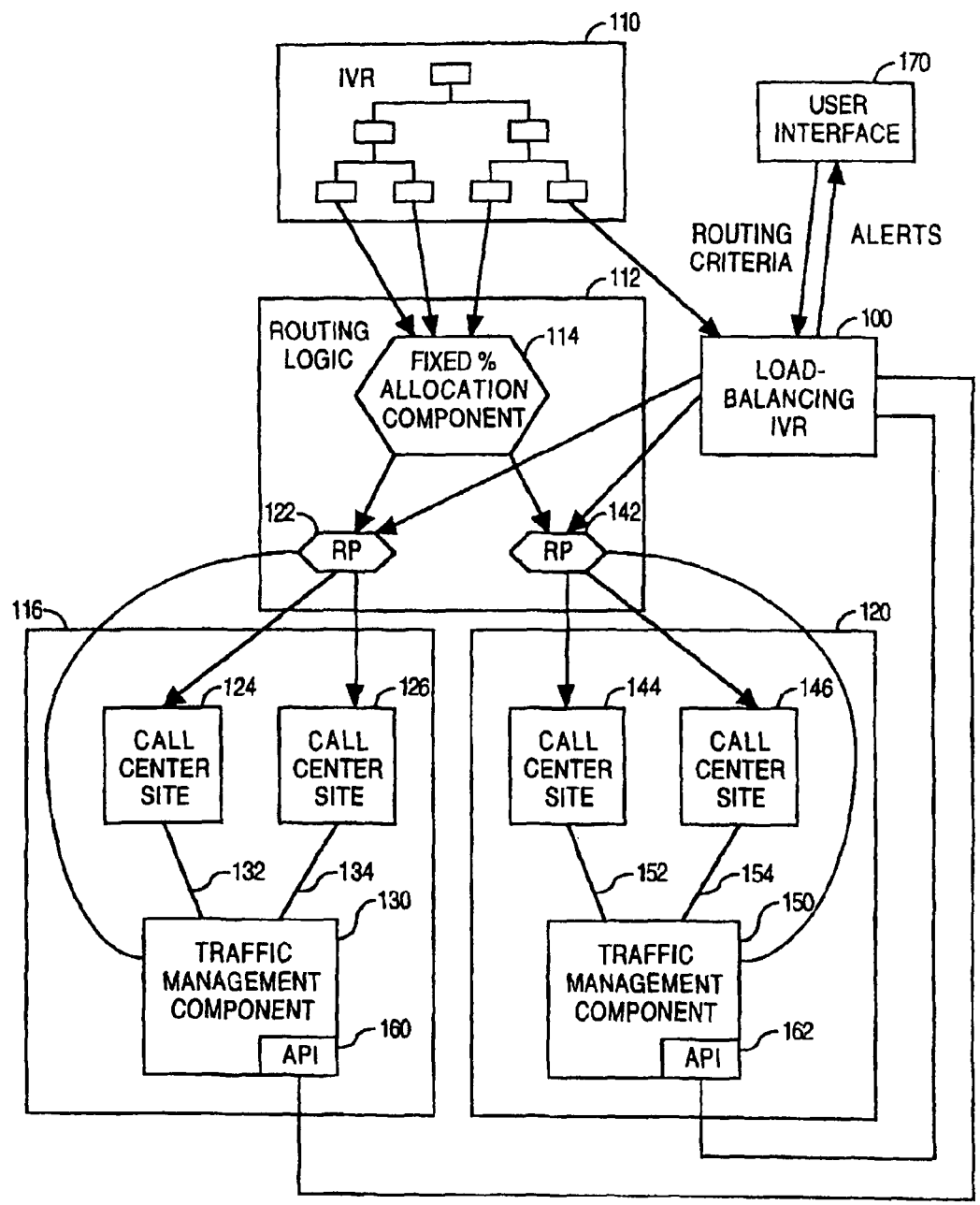
FIG. 2 is a schematic diagram of a second embodiment of a pre-ICM load balancing system which comprises a load-balancing IVR.

FIG. 2 is a schematic diagram of a second embodiment of a pre-ICM load balancing system that includes a load-balancing IVR system 100. A first percentage of calls received by a primary IVR 110 is routed to routing logic 112, and a second percentage of the calls received by the primary IVR 110 is routed to the load-balancing IVR 100. In general, the second percentage is about equal to or otherwise based on a maximum shift in allocation percentages between a first telephony system 116 and a second telephony system 120 which would occur if the manual approach in FIG. 1 was used. Thus, depending on the capacity and performance of call centers in the telephony systems 116 and 120, the first/second percentages may be 95%/5% or 90%/10% or 85%/15% or 80%/20%, for example. Preferably, the first percentage is greater than the second percentage so that most of the traffic is routed through the most inexpensive path possible while a small percentage of the traffic is routed through the load-balancing IVR 100 to dynamically balance telephony system loads. In practice, the load-balancing IVR 100 can initially receive 100% of the calls, and make a recommendation based on a sample of calls as to where to set the first/second percentage split. The recommendation can be outputted to a user via a user interface or an alert message such as an e-mail message.

The routing logic 112 includes an allocation component 114 to allocate a first percentage of its calls for the first telephony system 116 and a second percentage of its calls for the second telephony system 120. In the case of the two telephony systems 116 and 120, the sum of the first percentage and the second percentage is 100%. These percentages may be substantially fixed percentages. Those having ordinary skill will appreciate that the routing logic 112 may support more than two telephony systems in general.

The first telephony system 116 and the second telephony system 120 may be different types of telephony systems provided by different vendors. Examples of the different vendors include, but are not limited to, CISCO Systems, Inc. and GENESYS.

The load-balancing IVR 100 dynamically distributes its calls between the first and second telephony systems 116 and 120 based on agent availability data. A full description of the dynamic distribution follows a recitation of other components in the system.

The routing logic 112 comprises a first routing protocol (RP) component 122 to route each of the calls allocated to the first telephony system 116 to a corresponding one of multiple call centers 124 and 126. The call centers 124 and 126 typically are disposed at different geographical locations. Agents at the call centers 124 and 126 receive the calls and service the calling parties.

A first traffic management component 130 is in communication with the call centers 124 and 126 via peripheral gateway lines 132 and 134, respectively. The first traffic management component 130 determines call center information which includes first agent availability data for the call centers 124 and 126 of the first telephony system 116. The call center information may further comprise one or more Automatic Call Distribution (ACD) statistics such as a number of calls in queue, a service level, Average Holding Time (AHT), and/or Average Speed of Answer (ASA). The first RP component 122 is responsive to the call center information from the first traffic management component 130 to vary how subsequent calls are to be allocated between the call centers 124 and 126.

The routing logic 112 further comprises a second routing protocol (RP) component 142 to route each of the calls allocated to the second telephony system 116 to a corresponding one of multiple call centers 144 and 146. The call centers 144 and 146 typically are disposed at different geographical locations. Agents at the call centers 144 and 146 receive the calls and service the calling parties.

A second traffic management component 150 is in communication with the call centers 144 and 146 via peripheral gateway lines 152 and 154, respectively. The second traffic management component 150 determines call center information which includes second agent availability data for the call centers 144 and 146 of the second telephony system 120. The call center information may further comprise one or more ACD statistics such as a number of calls in queue, a service level, AHT, and/or ASA. The second RP component 142 is responsive to the call center information from the second traffic management component 150 to vary how subsequent calls are to be allocated between the call centers 144 and 146.

Each of the first and the second traffic management components 130 and 150 makes its call center information accessible to the load-balancing IVR 100. In one embodiment, the first traffic management component 130 comprises a Web-accessible application program interface (API) 160 to provide remote visibility of the first call center information, including first agent availability data, to the load-balancing IVR 100. Similarly, the second traffic management component 150 comprises a Web-accessible application program interface (API) 162 to provide remote visibility of the second call center information, including first agent availability data, to the load-balancing IVR 100.

In one embodiment, a call received by the primary IVR 110 and routed to the load-balancing IVR 100 is processed as follows. The load-balancing IVR 100 determines which of the telephony systems has a highest overall agent availability, and routes the received call to the telephony system having the highest overall agent availability.

To determine which telephony system the call is to be routed to, the load-balancing IVR 100 requests and receives the first call center information, including the first agent availability data, from the API 160 of the first traffic management component 130 and the second call center information, including the second agent availability data, from the API 162 of the second traffic management component 150. Additional first and second call center information that may be passed to the load-balancing IVR 100 includes the number of calls in queue, the service level, AHT, ASA, and/or other ACD statistics. The first and second call center information is communicated from the traffic management components 130 and 150 to the load-balancing IVR 100 over Web-based hook via a computer network using a communication protocol such as hypertext transfer protocol (HTTP). Although HTTP is preferred for purposes of portability and flexibility, alternatives such as dedicated frame relay or virtual private network (VPN) may be used.

Optionally, while determining which of the telephony systems has the highest overall agent availability, the load-balancing IVR 100 plays a message to the calling party within the call. The message may have a duration of about five to ten seconds, for example. The message may include a script advising the caller of an estimated hold time or his/her place in the queue based on the responses from the APIs 160 and 162.

Beneficially, the load-balancing IVR 100 can be remotely used by any other IVR over a standard voice path (e.g. a dedicated voice path or a plain old telephone service voice path). Thus, no data integration to other IVRs in the call centers 124, 126, 144 or 146 is required by the load-balancing IVR 100. In one embodiment, the load-balancing IVR 100 routes the call by performing a Dual Tone Multiple Frequency (DTMF) release transfer using a routing configuration of the telephony system having the highest overall agent availability. Any carrier's DTMF transfer function can be used, keeping inbound capacity requirements and call durations at or near a minimum.

In general, the scope of this disclosure is broadly inclusive of alternative criteria used by the load-balancing IVR 100 to determine which telephony system is to receive the call. Optionally, a graphical user interface 170 or another user interface receives user-specified routing criteria. The load-balancing IVR 100 processes its received calls based on the user-specified routing criteria. For example, the user-specified routing criteria may cause the load-balancing IVR 100 to favor a particular vendor's telephony system.

The load-balancing IVR 100 may be operative to generate an alert signal based on a trend or a surge defined by the agent availability data or other call center information received from the traffic management components 130 and 150. A particular business that offers the call centers to its customers may define its own alert conditions using the graphical user interface 170 or another user interface.

The acts performed by each of the herein-disclosed components can be directed by respective computer program code embodied in a computer-readable form on a computer-readable medium. Each of the herein-disclosed components may comprise a respective computer processor responsive to the computer program code to perform the acts.

It will be apparent to those skilled in the art that the disclosed embodiments may be modified in numerous ways and may assume many embodiments other than the particular forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A load-balancing interactive voice response system comprising:
    an input configured to receive a call from a primary interactive voice response system, wherein the primary interactive voice response system receives a plurality of calls and is configured to route a percentage of the plurality of calls to the load-balancing interactive voice response system;
    logic to select a telephony system from among a plurality of telephony systems based on agent availability data of the plurality of telephony systems; and
    at least one output to route the received call to a routing protocol component associated with a call center site of the selected telephony system based on a routing protocol associated with the selected telephony system.

2. The load-balancing interactive voice response system of claim 1, wherein the percentage of calls received from the primary interactive voice response is adjustable.

3. The load-balancing interactive voice response system of claim 1, wherein the logic selects the telephony system with a highest overall agent availability from among the plurality of telephony systems.

4. The load-balancing interactive voice response system of claim 1, wherein the logic plays a message to a caller while selecting the telephony system.

5. The load-balancing interactive voice response system of claim 1, wherein the at least one output performs a dual tone multiple frequency release transfer to route the received call for allocation.

6. The load-balancing interactive voice response system of claim 1, further comprising at least one traffic management interface to receive agent availability data from at least one of the plurality of telephony systems.

7. The load-balancing interactive voice response system of claim 6, wherein the at least one traffic management interface comprises a web-interface to access the agent availability data via a web-accessible application program interface of the at least one of the plurality of telephony systems.

8. The load-balancing interactive voice response system of claim 1, further comprising at least one traffic management interface to receive call distribution statistics from at least one of the plurality of telephony systems, wherein the logic selects the telephony system based at least partially on the call distribution statistics.

9. The load-balancing interactive voice response system of claim 1, wherein an adjustable percentage of calls received by the primary interactive voice response system are routed to the input, and wherein the logic recommends the adjustable percentage based on a sample of calls received.

10. The load-balancing interactive voice response system of claim 1, wherein the input comprises a voice path input.

11. The load-balancing interactive voice response system of claim 1, further comprising a user interface to receive user-specified routing criteria, wherein the logic selects the telephony system based at least partially on the user-specified routing criteria.

12. A method comprising:
    receiving a call from a primary interactive voice response system at a load-balancing interactive voice response system, wherein the primary interactive voice response system receives a plurality of calls and is configured to route a first percentage of the plurality of calls to routing logic and to route a second percentage of the plurality of calls to the load-balancing interactive voice response system;
    selecting a telephony system from among a plurality of telephony systems based on agent availability data associated with call center sites of the plurality telephony systems; and
    routing the call to a routing protocol component of the routing logic, wherein the routing protocol component routes the call to a call center of the selected telephony system.

13. The method of claim 12, wherein selecting the telephony system comprises determining which of the plurality of telephony systems has a highest overall agent availability, and selecting the telephony system having the highest overall agent availability.

14. The method of claim 12, wherein routing the call to the routing protocol component comprises performing a dual tone multiple frequency (DTMF) release transfer using a routing configuration of the selected telephony system.

15. The method of claim 12, wherein receiving the call from the primary interactive voice response comprises receiving a voice call without transfer of other data.

16. The method of claim 12, further comprising receiving user-specified routing criteria, wherein the telephony system is selected based at least partially on the user-specified routing criteria.

17. The method of claim 12, further comprising determining a recommended percentage of calls received by the primary interactive voice response system to be sent to the load-balancing interactive voice response system.

18. The method of claim 12, further comprising receiving the agent availability data from at least one call center site via a web-accessible application program interface.

19. The method of claim 12, further comprising generating an alert signal based on a trend or a surge indicated by the agent availability data.

20. A method comprising:
    receiving, at routing logic, a call directed to a primary interactive voice response system, wherein the primary interactive voice response system is configured to route a first percentage of received calls to the routing logic and to route a second percentage of the received calls to a load-balancing interactive voice response system, wherein the first percentage of calls received at the routing logic is based at least partially on routing criteria;

receiving agent availability data associated with a plurality of telephony systems; and dynamically routing the call based at least partially on the agent availability data.

21. The method of claim 20, wherein dynamically routing the call comprises sending the call to a routing protocol component of the routing logic that is associated with at least one telephony system, wherein the routing protocol component allocates the call to a call center site of the at least one telephony system.

22. The method of claim 20, further comprising setting the routing criteria based on the agent availability data.

* * * * *